(12) United States Patent
Gu et al.

(10) Patent No.: US 11,046,808 B2
(45) Date of Patent: Jun. 29, 2021

(54) THERMADAPT SHAPE MEMORY POLYMER AND APPLICATION METHOD THEREOF

(71) Applicant: SOOCHOW UNIVERSITY, Suzhou (CN)

(72) Inventors: Aijuan Gu, Suzhou (CN); Zhenjie Ding, Suzhou (CN); Guozheng Liang, Suzhou (CN); Li Yuan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 191 days.

(21) Appl. No.: 16/564,802

(22) Filed: Sep. 9, 2019

(65) Prior Publication Data
US 2020/0231742 A1 Jul. 23, 2020

(30) Foreign Application Priority Data

Jan. 22, 2019 (CN) .......................... 201910060590.X

(51) Int. Cl.
| | |
|---|---|
| C08G 59/24 | (2006.01) |
| C08J 3/24 | (2006.01) |
| C08K 5/17 | (2006.01) |
| C08K 5/20 | (2006.01) |
| C08G 59/64 | (2006.01) |
| C08G 59/40 | (2006.01) |
| C08K 5/00 | (2006.01) |
| C08K 5/5415 | (2006.01) |

(52) U.S. Cl.
CPC ....... *C08G 59/245* (2013.01); *C08G 59/4085* (2013.01); *C08G 59/64* (2013.01); *C08J 3/242* (2013.01); *C08K 5/17* (2013.01); *C08K 5/20* (2013.01); *C08G 2280/00* (2013.01); *C08J 2363/00* (2013.01); *C08K 5/0025* (2013.01); *C08K 5/5415* (2013.01)

(58) Field of Classification Search
CPC .......................... C08G 2280/00; C08G 59/64; C08G 59/1444; C08G 59/4085
See application file for complete search history.

(56) References Cited

U.S. PATENT DOCUMENTS

2008/0262188 A1* 10/2008 Xie .................. C09J 163/00
528/98

* cited by examiner

*Primary Examiner* — Kregg T Brooks
(74) *Attorney, Agent, or Firm* — SZDC Law P.C.

(57) ABSTRACT

A preparation method of thermadapt shape memory polymers includes: (1) synthesis of pendant hydroxyl groups functionalized epoxy oligomer using epoxy resin and alcohol amine; (2) synthesis of alkoxyl groups terminated silane crosslinking agent by isocyanate silane coupling agent and diamine; (3) crosslinked shape memory polymers were prepared by condensation reaction of pendant hydroxyl groups functionalized epoxy oligomer and alkoxyl groups terminated silane crosslinking agent. The thermadapt shape memory polymers show high glass transition temperatures and high tensile strength. The original shape of thermadapt shape memory polymers can be reconfigured to a new permanent shape as needed, and thus effectively solving the bottleneck problems of reprocessing or reshape in the traditional crosslinked polymers once after molding. The thermadapt shape memory polymers are suitable for smart materials based on shape memory polymers with complex three-dimensional permanent shapes, and showing unfolding or folding behaviors along with convert to three-dimensional structures under heat stimulation.

10 Claims, 12 Drawing Sheets

THERMADAPT SHAPE MEMORY POLYMER AND APPLICATION METHOD THEREOF

This application claims priority to Chinese Patent Application No.: 201910060590.X, filed on Jan. 22, 2019, which is incorporated by reference for all purposes as if fully set forth herein.

TECHNICAL FIELD

The present invention relates to a shape memory polymer and its preparation method, in particular to a thermadapt shape memory polymer and its preparation and application method thereof method, belonging to the technical field of functional polymer materials.

TECHNICAL BACKGROUND

In recent years, with the rapid development of aerospace and electronics industry, such as deployable devices, deformable robotics and intelligent packaging equipment, three-dimensional (3D) structures with self-folding and self-deployable ability are more urgent need for smart materials, both with high glass transition temperature ($T_g$>80° C.) and high tensile strength (>30 MPa), to function in practical applications.

Generally speaking, 3D structures can be fabricated by sophisticated moulding technology or mechanically assemble of parts. However, these traditional methods are costly and time-consuming. Smart materials with 3D structures can be obtained by latest 3D printing technology, which is called 4D printing, and yet the limitations of this technology lie in the variety of the printable materials and printing speed. Therefore, thermadapt shape memory polymer (TASMP), as an intelligent deformable material that can reconfigure its initial shape to obtain a new 3D permanent shape, has attracted more and more attention.

The key to prepare TASMP is to design a shape memory crosslinked network containing dynamic covalent bonds, which depends on the type of polymer and the dynamic chemistry. Currently, a variety of TASMPs have been reported, including thermoset polyurethane, crosslinked poly(caprolactone), crosslinked polyanhydride, polysulfide networks, crosslinked poly(styrene-block-butadieneblock-styrene), crosslinked epoxidized natural rubber, crosslinked polyacrylate and epoxy resin. However, the $T_g$ of the above TASMPs universally below 80° C. and the tensile strength lower than 30 MPa, which is difficult to meet the requirement of the application in high performance deployable structures and robots. On the other hand, dynamic chemistry that have been applied to TASMPs including transesterification, transcarbamoylation, Diels-Alder (DA) reaction, disulfide exchange reaction, diselenide chemistry and reversible TAD (1,2,4-triazoline-3,5-dione) chemistry. Among them, the reversible DA bonds, reversible TAD bonds, disulfide exchange bonds and diselenide exchange bonds show relatively poor thermal stability. DA bonds and TAD bonds are disconnected above 130° C., while the initial thermal decomposition temperatures ($T_{di}$) of TASMPs containing disulfide bonds or diselenide bonds are below 270° C. The TASMPs based on transesterification and transcarbamoylation usually require an additional catalyst. Therefore, finding a new dynamic covalent bond to build a new high performance TASMP simultaneously with high heat resistance and high mechanical strength is still a meaningful challenge.

THE INVENTION CONTENT

The purpose of the present invention is to provide a thermadapt shape memory polymer system with both high glass transition temperature and high tensile strength, as well as its preparation and application method aiming at the shortcomings of existing technologies.

The present invention adopts the following technical scheme:

The present invention relates to a thermadapt shape memory polymer, and the preparation method of the thermadapt shape memory polymer comprises the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) the thermadapt shape memory polymers were prepared using epoxy oligomers with hydroxyl side-groups and silane crosslinking agents with terminated alkoxyl groups.

A method for preparing a thermadapt shape memory polymer comprises the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) the thermadapt shape memory polymers were prepared using epoxy oligomers with hydroxyl side-groups and silane crosslinking agents with terminated alkoxyl groups.

A crosslinked system for thermadapt shape memory polymers, and the preparation method of the crosslinked system for thermadapt shape memory polymers includes the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) a crosslinked system for thermadapt shape memory polymers were prepared using epoxy oligomers with hydroxyl side-groups and silane crosslinking agents with terminated alkoxyl groups which were dissolved in an amide solvent.

A method for preparing a crosslinked system for a thermadapt shape memory polymer, including the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) a crosslinked system for thermadapt shape memory polymers were prepared using epoxy oligomers with hydroxyl side-groups and silane crosslinking agents with terminated alkoxyl groups which were dissolved in an amide solvent.

The present invention also discloses the application of the thermadapt shape memory polymer in the preparation of shape memory materials.

The present invention also discloses the shape memory recovery method of the thermadapt shape memory polymer, including the following steps:

(1) when heated to the temperature above the glass transition temperature, the thermadapt shape memory polymer was transformed into a temporary shape under external force, then heated to 180~200° C. and kept for 1~2 h; after cooled to room temperature, the shape memory polymer material with a reconfigurable shape was obtained;

(2) when heated to the temperature above the glass transition temperature, the shape memory polymer material with a reconfigurable shape prepared in the step (1) was transformed into a temporary shape with external force, then cooled to room temperature and obtain a shape memory polymer material with a temporary shape;

(3) when reheated to the temperature above the glass transition temperature, the shape memory polymer material with a temporary shape can spontaneously recover to the reconfigurable shape.

The technical scheme mentioned above, the temperature above the glass transition temperature is over glass transition temperature of 10~20° C.; the reconfigurable shape and temporary shape is obtained by external force.

The present invention also discloses a shape memory polymer material with reconfigurable shape and the preparation method thereof includes the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) the thermadapt shape memory polymers were prepared using epoxy oligomers with hydroxyl side-groups and silane crosslinking agents with terminated alkoxyl groups.

(4) the polymer materials with reconfigurable shape was obtained by transformed to a reconfigurable shape when heated to the temperature above the glass transition temperature and the heated to 180~200° C. and kept for 1~2 h.

The present invention also discloses a preparation method of a polymer material with a reconfigurable shape, including the following steps:

(1) epoxy oligomers with hydroxyl side-groups were synthesized by epoxy resin and alcohol amine;

(2) silane crosslinking agent with terminated alkoxyl groups was synthesized by silane coupling agent and diamine;

(3) the thermadapt shape memory polymers were prepared using epoxy oligomers with hydroxyl side-groups and silane crosslinking agents with terminated alkoxyl groups.

(4) the polymer materials with reconfigurable shape was obtained by transformed to a reconfigurable shape when heated to the temperature above the glass transition temperature and the heated to 180~200° C. and kept for 1~2 h.

In the present invention, the preparation method of the thermadapt shape memory polymer is as follows:

(1) under the condition of 20~30° C., epoxy oligomer with hydroxyl side-groups was synthesized by epoxy resin and alcohol amine in N,N-dimethylformamide under nitrogen atmosphere;

(2) under the condition of 20~30° C., diamine was dissolved in chloralkane and the added silane coupling agent with isocyanate groups drop by drop under stirring, after that the silane crosslinking agent with terminated alkoxyl groups was synthesized under nitrogen atmosphere;

(3) epoxy oligomers with hydroxyl side-groups and silane crosslinking agents with terminated alkoxyl groups were dissolved in N,N-dimethyl formamide and form a uniform mixture, then the mixture was poured into the mold for condensation crosslinking reaction. The polymer was then removed from the mold and dried in a vacuum oven to obtain a thermadapt shape memory polymer.

Further, in step (1) mentioned above, the mixture was added to deionized water drop by drop when the reaction finished, and then the precipitated white solid was filtered, washed and dried to obtain the epoxy oligomer with hydroxyl side-groups; In step (2), after the reaction, the chlorohydrin was decompressed and evaporated to obtain silane crosslinking agent with terminated alkoxyl groups; In Step (3), the drying temperature is 120~200° C. for 2~15 h, optimization for a period of 120° C./12 h±200° C./2 h.

In the present invention, the epoxy resin mentioned above includes one or more of bisphenol A epoxy resin, bisphenol F epoxy resin, the hydrogenated epoxy resin; the alcohol amine mentioned above comprises one or more of an ethanolamine, a 3-aminopropanol and a 2-(2-aminoethoxy) ethanol; the diamine mentioned above is one or more of the 4,4'-methylenedianiline, 4,4'-diaminodiphenylsulfone and 4,4'-oxydianiline; the isocyanate silane coupling agent is one or more of the 3-isocyanatopropyltrimethoxysilane and 3-isocyanatopropyltriethoxysilane.

In the invention, epoxy resin reacts with alcohol amine in an amide solvent under nitrogen atmosphere; diamine reacts with silane coupling agent in chloroalkane under nitrogen atmosphere. Preferably, the chloroalkane is one or more of dichloromethane, chloroform and 1,2-Dichloroethane, the amide solvent is N,N-dimethylformamide; the reaction temperature of epoxy resin and alcohol amine is 120° C. and the reaction time is 10~12 h; the reaction temperature of diamine and silane coupling agent is 80° C. and the reaction time is 4~6 h; the reaction temperature of epoxy oligomer with hydroxyl side-groups and silane crosslinking agent with terminated alkoxyl groups is 80° C. and the reaction time is 10~12 h; the mass ratio of epoxy resin and alcohol amine is 100:(15~25), the mass ratio of diamine and silane coupling agent is 100:(190~230), the mass ratio of epoxy oligomer with hydroxyl side-groups and silane crosslinking agent with terminated alkoxyl groups is 100:(20~60), optimization for the mass ratio of epoxy resin and alcohol amine is 100:(18~22), optimization for the mass ratio of diamine and silane coupling agent is 100:(199~228), optimization for the mass ratio of epoxy oligomer with hydroxyl side-groups and silane crosslinking agent with terminated alkoxyl groups is 100:(20~60).

In step (3) of the present invention, epoxy oligomer with hydroxyl side-groups and silane crosslinking agent with terminated alkoxyl groups are dissolved in amide solvent to obtain the crosslinking system for the thermadapt shape memory polymer, and then the thermadapt shape memory polymer was obtained from the condensation reaction and after drying.

The thermadapt shape memory polymer disclosed by the present invention can be transformed to any temporary shapes at the temperature above glass transition temperature (optimization temperature is over glass transition temperature of 10~20° C.) under external force and became a shape memory polymer material with a reconfiguration shape, then no matter how to change the shape (temporary shape), the shape memory materials can recover to the reconfiguration shape, specifically as follows:

(1) when heated to the temperature above glass transition temperature 10~20° C., the thermadapt shape memory polymer was transformed to a new shape as needed under external force; then heated to 180~200° C. and kept for 1~2 h under external force and the dynamic exchange reaction take place in the networks; after that, cooled to room temperature, the new shape is fixed and obtaining a permanent reconfigurable shape (shape B) of the polymer material.

(2) when heated to the temperature above the glass transition temperature 10~20° C., the polymer materials with reconfigurable shape was transformed into any temporary shape as needed (shape C) under external force; after cooled to room temperature, the polymer material with a temporary shape is fixed;

(3) when reheated to the temperature above the glass transition temperature above 10~20° C., the polymer will automatically return to the permanent shape (shape C) from the temporary shape.

The glass transition temperature was determined by the thermadapt shape memory polymer, and the specific method to obtain the reconfigurable shape and temporary shape by applying external force was not limited, and different external forces were applied according to different shapes.

Compared with existing technologies, the beneficial effects of the present invention are as follows:

1. The thermadapt shape memory polymer based on silyl ether was first preparation. Silyl ether is a kind of dynamic covalent bonds with thermally stability and robust strength, and it can be a candidate for dynamic materials chemistry in the presence of hydroxyl groups without catalyst. The thermadapt shape memory polymer prepared in the present invention shows the initial thermal decomposition temperature (the temperature at 5% weight loss) of 296~325° C. and the thermadapt behavior trigger temperature of 180~220° C.

2. The thermadapt shape memory polymer prepared in the present invention exhibits high glass transition temperature (118~156° C.) that higher than 115° C., and high tensile strength (59.3~82.4 MPa) that higher than 55 MPa, which provides the reliable basis for the cutting-edge applications in the field of solar self-deployable structures and load-bearing deformation robots. These excellent properties are mainly attributed to the aromatic structures and high cross-linking density provided by silyl ether linkages formed by the condensation of terminated six-functional alkoxyl groups.

3. The thermadapt shape memory polymer prepared in the present invention shows the advantage of reconfigure or reshape its initial shape, especially convert two-dimensional plane initial shape to a new three-dimensional permanent shape in a simple way. Owing to the dynamic exchange reaction of silyl ether and hydroxy group in networks at reconfigurable temperature (180~200° C.) and realizing the reconfiguration of topology structures, the stable new permanent shape was obtained. The thermally adaptable shape memory polymer prepared in the present invention overcomes the bottleneck problems that the shape cannot be reshaped after the traditional molding and it can be used as a shape memory polymer with three-dimensional permanent shape, greatly expanding the applicable scope of the shape memory polymer.

4. The thermadapt shape memory polymer prepared in the present invention exhibit adjustable glass transition temperatures (118~156° C.) and reconfigurable temperatures (180~220° C.), in facilitating polymers on the basis of the original shape reconfigurable, which is suitable for the use of a variety of circumstances.

5. The thermadapt shape memory polymer prepared in the present invention shows a simple preparation method and suitable for industrial mass production; At the same time, the reconfigurable method of three-dimensional shape of the thermadapt shape memory polymer prepared in the present invention is simple and effective, saving the processing cost of the original three-dimensional structures.

EXAMPLES

The technical scheme of the present invention is further elaborated in combination with attached Figures and Examples.

Example 1

(1) under the condition of 25° C., by mass, Bisphenol A epoxy (E51, 50 g), ethanolamine (9 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained. The $^1$H NMR spectra of epoxy oligomer with hydroxyl side-groups according to Example 1 was shown in FIG. 1.

(2) under the condition of 25° C., by mass, 4,4'-diaminodiphenylmethane (5 g) was added to a three-necked flask and stirred to dissolve in chloroform (100 mL) at room temperature. 3-isocyanatopropyltrimethoxysilane (10.35 g) was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained. $^1$H NMR spectra of silane crosslinking agent with terminated methoxy groups according to Example 1 was shown in FIG. 2.

Figure 3:
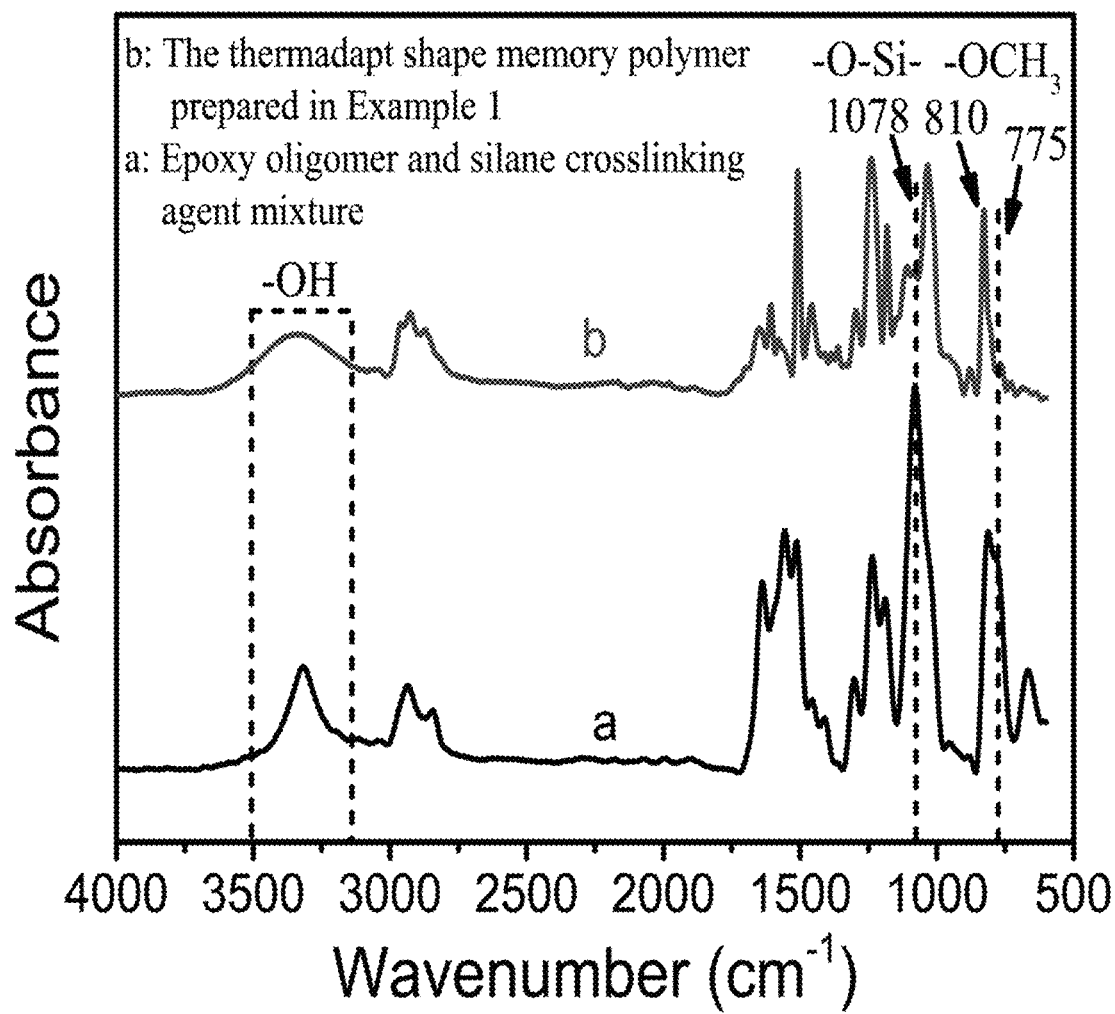
FIG. 3 shows FTIR spectra of the thermadapt shape memory polymer according to Example 1.

(3) under the condition of 25° C., epoxy oligomer with hydroxyl side-groups according to step 1 (5 g) and silane crosslinking agent with terminated methoxy groups according to step 1 (1.7 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained. FTIR spectra of the thermadapt shape memory polymer according to Example 1 is shown in FIG. 3. The silyl ether linkages in the networks were obtained by condensation reaction of terminated methoxy six-functional groups. The crosslinking density of polyfunctional groups was higher than that of difunctional groups. The crosslinking density calculated from the thermadapt shape memory polymer in the present invention reaches 2510 mol/m$^3$, which is higher than the crosslinking density of the thermadapt shape memory polymers reported in the literature.

(4) When heated to the temperature above the glass transition temperature (140° C.), the thermadapt shape memory polymer was transformed from a two-dimensional plane original shape into a designing three-dimensional box shape under external force; Then the thermadapt shape memory with box shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional box shape is fixed and obtaining a new permanent shape of the themadapt shape memory polymer.

Figure 6:
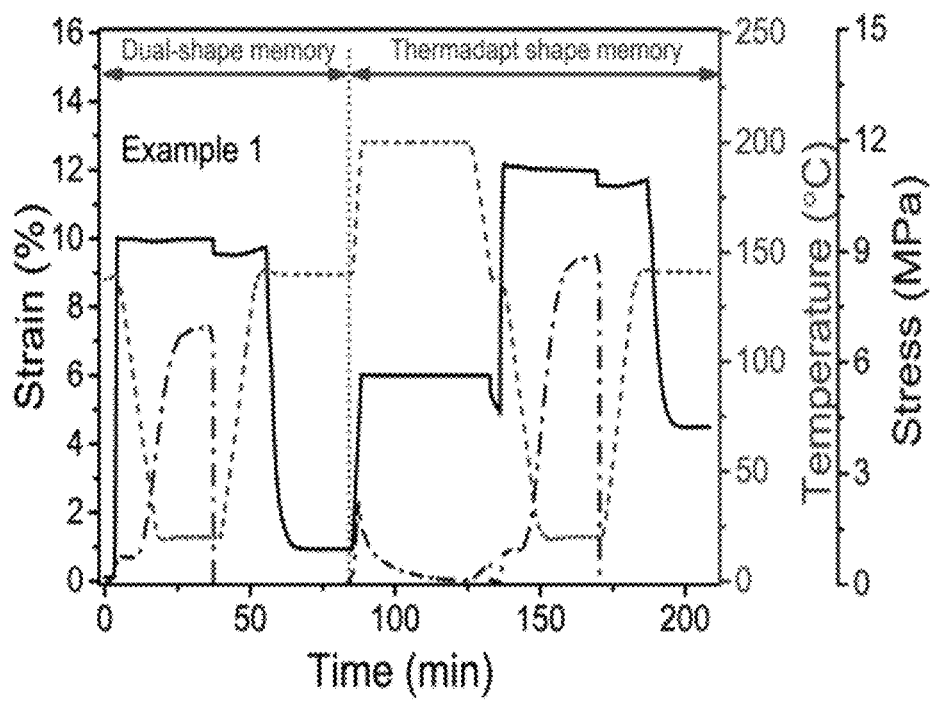
FIG. 6 shows shape memory curves tested by DMA of the thermadapt shape memory polymer according to Example 1.
Figure 7:
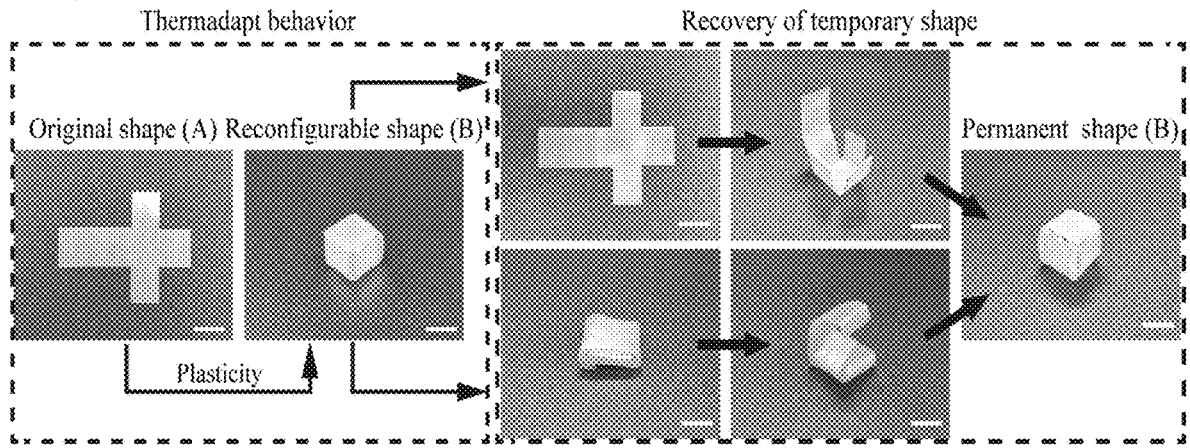
FIG. 7 shows shape memory behaviors of the thermadapt shape memory polymer according to Example 1.

The themadapt shape memory polymer with box shape mentioned above is heated to the temperature above the glass transition temperature (140° C.) and transformed into a temporary shape of two-dimensional plane or folded shape under external force; Then cooled to room temperature, the temporary shapes were fixed; finally, when reheated to the temperature above the glass transition temperature (140° C.), the thermadapt shape memory polymer with two-dimensional plane or folded temporary shapes will spontaneously recover to the new permanent box shape. The shape memory curves tested by DMA of the thermadapt shape memory polymer according to Example 1 are shown in FIG. 6, and shape memory behaviors of the thermadapt shape memory polymer according to Example 1 are shown in FIG. 7.

Figure 1:
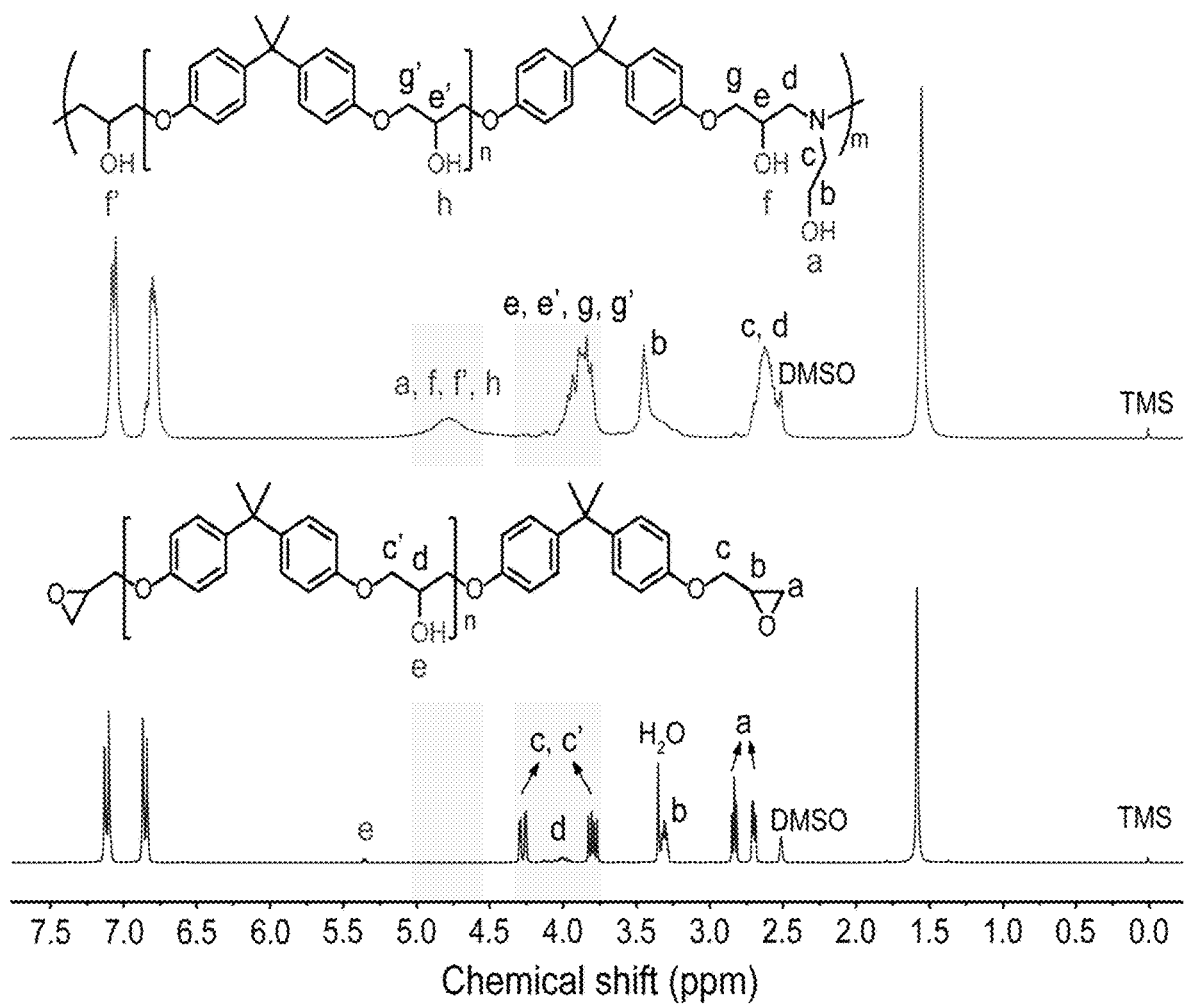
FIG. 1 shows $^1$H NMR spectra of epoxy oligomer with hydroxyl side-groups according to Example 1.

FIG. 1 shows the $^1$H NMR spectra of epoxy oligomer with hydroxyl side-groups according to Example 1. The characteristic peaks of protons on epoxy group (δ=2.6 ppm and δ=2.8 ppm, a) disappear and show up the overlapping peaks (δ=2.52-2.72 ppm, c, d) of protons on methylene group adjacent to nitrogen atom. In addition, the broad peaks at 4.51-5.10 ppm (a, f, f', h) correspond to protons on hydroxyl group, indicating that a number of hydroxyl group in epoxy oligomer with hydroxyl side-groups. The overlapping board peaks at 3.68-4.04 ppm (e, e', g, g') represent protons of repeating unit on tertiary carbon atom adjacent to hydroxyl group and methylene group adjacent to ether bond, indicating that amino groups of ethanolamine reacted with the epoxy groups to give an oligomer. The GPC results show the number average molecular weight of epoxy oligomer is 5200 g/mol.

Figure 2:
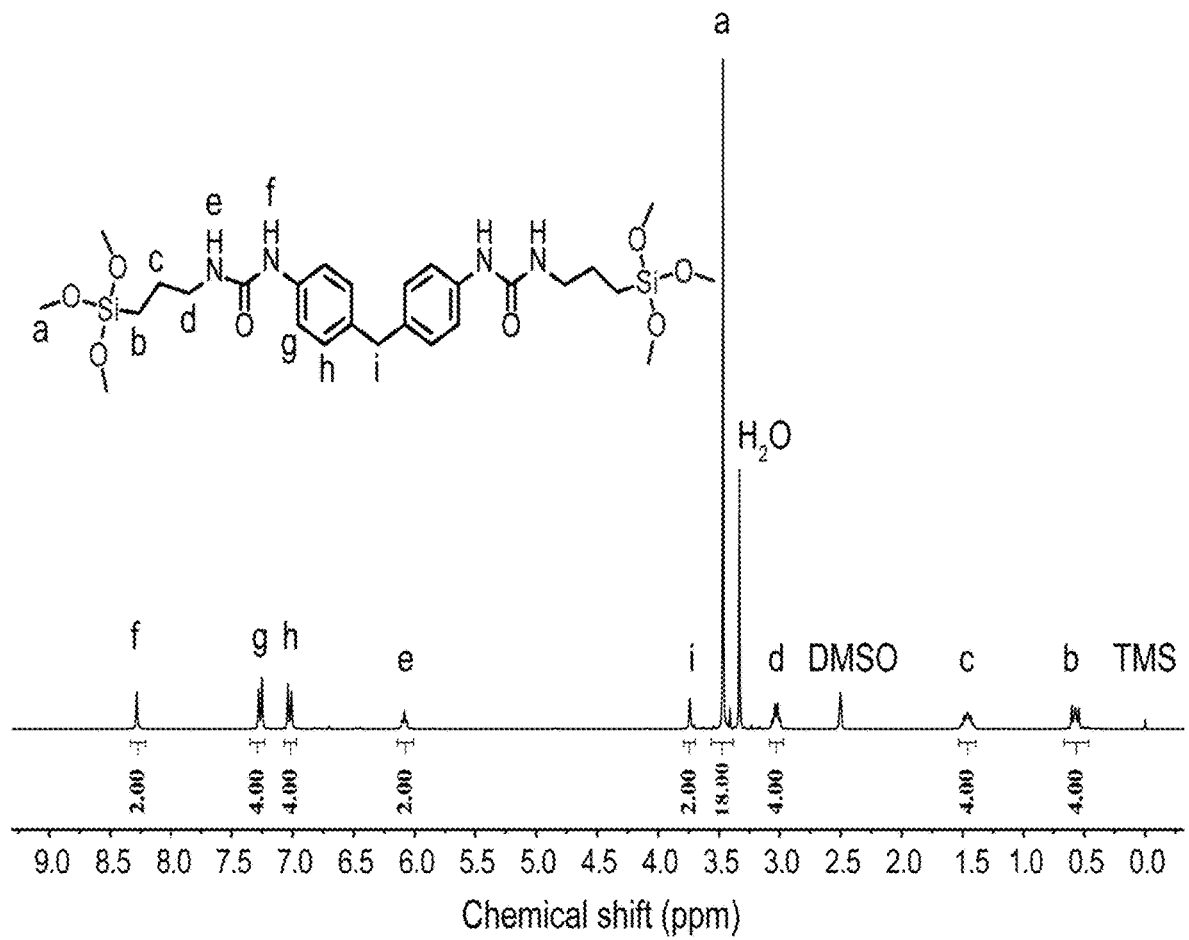
FIG. 2 shows $^1$H NMR spectra of silane crosslinking agent with terminated methoxy groups according to Example 1.

FIG. 2 shows $^1$H NMR spectra of silane crosslinking agent with terminated methoxy groups. All the characteristic peaks of protons are shown in the $^1$H NMR spectrum of silane crosslinking agent with terminated methoxy groups, concluding protons of methoxy group (3.47 ppm, a), protons of three methylene adjacent to silicon atom (0.56-0.60 ppm, b; 1.46 ppm, c; 3.01 ppm, d).

FIG. 3 shows the FTIR spectra of FTIR spectra of the thermadapt shape memory polymer according to Example 1. Compared with the spectrum of epoxy oligomer/silane crosslinking agent mixtures, a new absorption peak of —O—Si— (1000-1150 cm$^{-1}$) show up in the spectrum of the thermadapt shape memory polymer, and the absorption peak intensity of methoxy group (810 cm$^{-1}$ and 775 cm$^{-1}$) eventually disappear. These results indicate that the hydroxyl groups have reacted with the methoxy groups to remove the methanol and form a crosslinking network.

Figure 4:
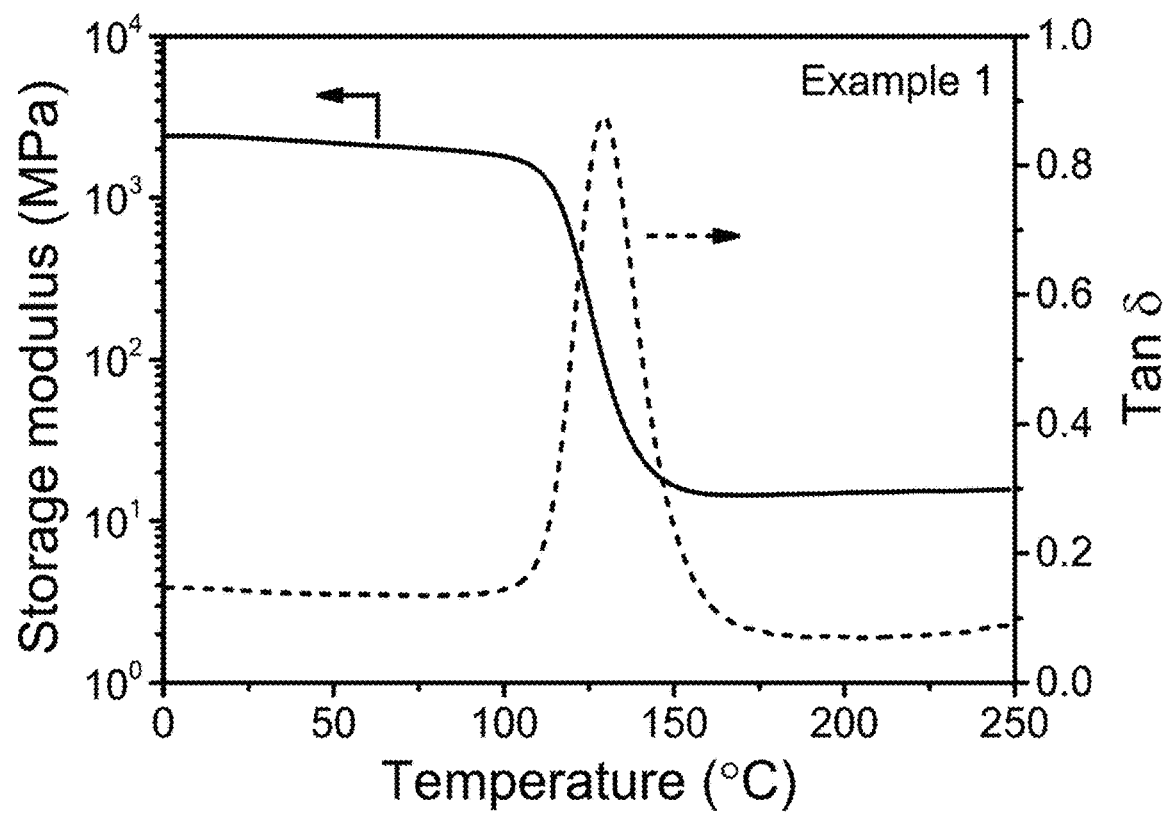
FIG. 4 shows DMA curves of the thermadapt shape memory polymer according to Example 1.

FIG. 4 shows the DMA curves of the thermadapt shape memory polymer according to Example 1. The glass transition temperature of the thermadapt shape memory polymer is 129.3° C.

Figure 5:
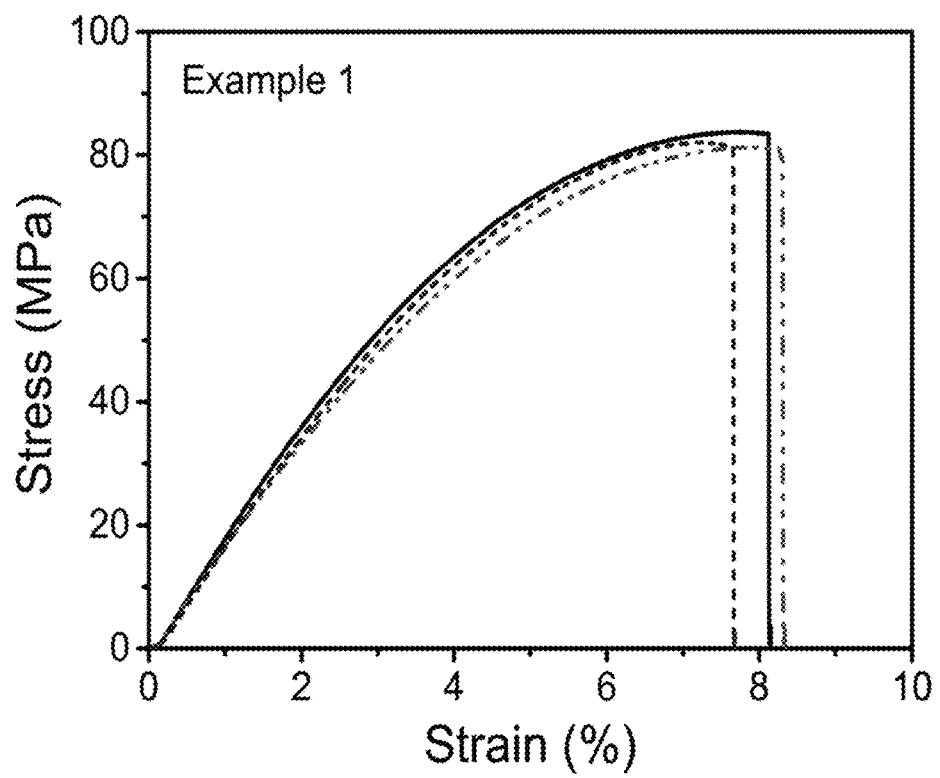
FIG. 5 shows tensile stress-strain curves of the thermadapt shape memory polymer according to Example 1.

FIG. 5 shows the tensile stress-strain curves of the thermadapt shape memory polymer according to Example 1. The tensile strength of the thermadapt shape memory polymer is 82.4±1.3 MPa.

FIG. 6 shows the shape memory curves tested by DMA of the thermadapt shape memory polymer according to Example 1. The test procedure includes dual-shape memory behavior and thermadapt shape memory behavior. Dual-shape memory behavior is conducted as follows: First, the specimen is heated to the programming temperature (140° C.) and stretched to the strain of 10% under external loading; next, the stretched specimen is cooled to 20° C. and then unloaded the external force to obtain a temporary shape; finally, the specimen with a temporary shape is reheated to 140° C. for recovery without force. thermadapt shape memory behavior is as follows: the specimen is heated to the programming temperature (140° C.) and stretched to the strain of 6% under external loading and then heated to 200° C. and kept for 60 min to trigger the dynamic exchange of silyl ether and hydroxy group in networks and obtaining the reconfiguration shape with strain of 6%; after that, the specimen was continued to conduct a typical dual-shape memory test on the basis of the new permanent strain mentioned above.

FIG. 7 shows shape memory behaviors of the thermadapt shape memory polymer according to Example 1. When heated to the temperature above the glass transition temperature (140° C.), the thermadapt shape memory polymer was transformed from a two-dimensional plane original shape into a designing three-dimensional box shape under external force; Then the thermadapt shape memory with box shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional box shape is fixed and obtaining a new permanent shape of the themadapt shape memory polymer.

The themadapt shape memory polymer with box shape mentioned above is heated to the temperature above the glass transition temperature (140° C.) and transformed into a temporary shape of two-dimensional plane or folded shape under external force; Then cooled to room temperature, the temporary shapes were fixed; finally, when reheated to the temperature above the glass transition temperature (140° C.), the thermadapt shape memory polymer with two-dimensional plane or folded temporary shapes will spontaneously recover to the new permanent box shape.

Example 2

(1) under the condition of 25° C., by mass, Bisphenol A epoxy (E51, 50 g), ethanolamine (9 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylmethane (5 g) was added to a three-necked flask and stirred to dissolve in chloroform (100 mL) at room temperature. 3-isocyanatopropyltrimethoxysilane (10.35 g) was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained.

(3) under the condition of 20~30° C., by mass, epoxy oligomer with hydroxyl side-groups according to step 1 (5 g) and silane crosslinking agent with terminated methoxy groups according to step 1 (1 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature (130° C.), the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the thermadapt shape memory polymer.

The thermadapt shape memory polymer with three-dimensional shape mentioned above is heated to the temperature above the glass transition temperature (130° C.) and transformed into a temporary shape of two-dimensional plane or folded shape under external force; Then cooled to room temperature, the temporary shapes were fixed; finally, when reheated to the temperature above the glass transition temperature (130° C.), the thermadapt shape memory polymer with two-dimensional plane or folded temporary shapes will spontaneously recover to the new permanent three-dimensional shape. The shape memory curves tested by DMA of the thermadapt shape memory polymer according to Example 2 are shown in FIG. 10.

Figure 10:
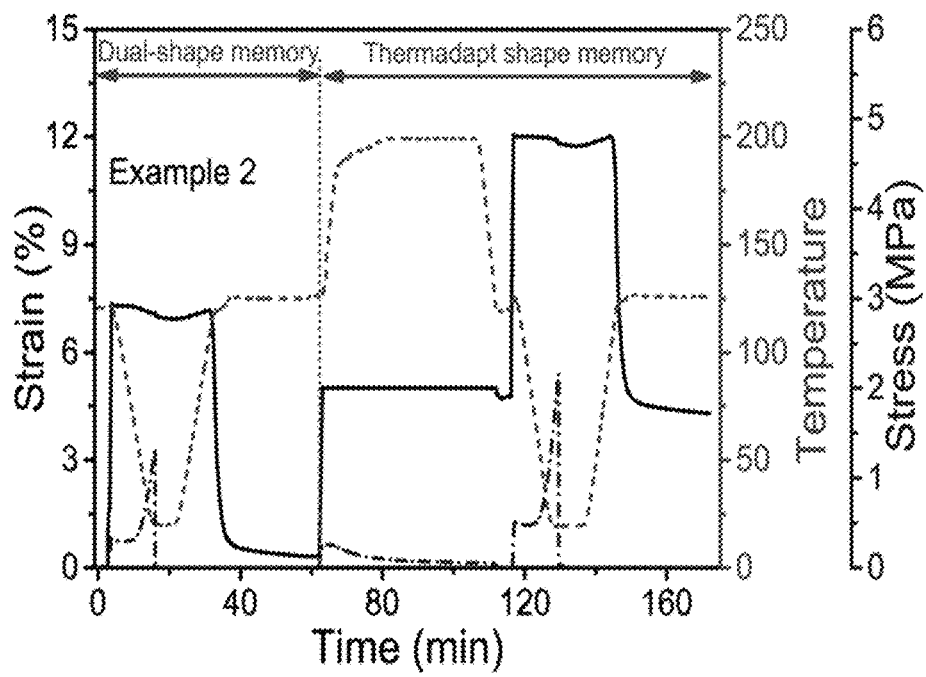
FIG. 10 shows shape memory curves tested by DMA of the thermadapt shape memory polymer according to Example 2.

FIG. 10 shows the shape memory curves tested by DMA of the thermadapt shape memory polymer according to Example 2. The test procedure includes dual-shape memory behavior and thermadapt shape memory behavior. Dual-shape memory behavior is conducted as follows: First, the specimen is heated to the programming temperature (130° C.) and stretched to the strain of 10% under external loading; next, the stretched specimen is cooled to 20° C. and then unloaded the external force to obtain a temporary shape; finally, the specimen with a temporary shape is reheated to 130° C. for recovery without force. thermadapt shape memory behavior is as follows: the specimen is heated to the programming temperature (130° C.) and stretched to the strain of 6% under external loading and then heated to 200° C. and kept for 60 min to trigger the dynamic exchange of silyl ether and hydroxy group in networks and obtaining the reconfiguration shape with strain of 6%; after that, the specimen was continued to conduct a typical dual-shape memory test on the basis of the new permanent strain mentioned above.

Figure 11:
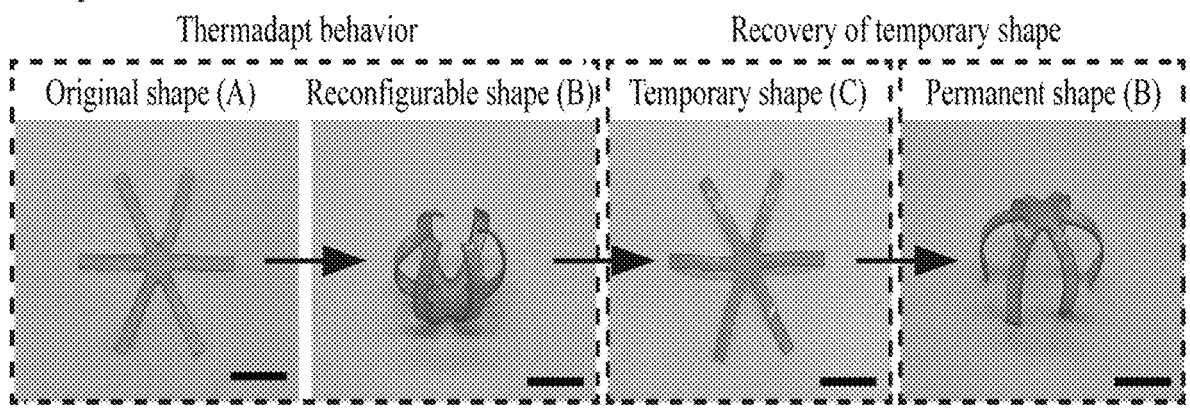
FIG. 11 shows shape memory behaviors of the thermadapt shape memory polymer according to Example 2.

FIG. 11 shows shape memory behaviors of the thermadapt shape memory polymer according to Example 2. When heated to the temperature above the glass transition temperature (138.1° C.), the thermadapt shape memory polymer was transformed from a two-dimensional plane original shape into a designing three-dimensional "six-claw stool" shape under external force; Then the thermadapt shape memory with box shape was heated to 180° C. and keep the temperature and the external force, and the dynamic exchange reaction of silyl ether and hydroxy group in networks and realizing the reconfiguration of networks; When cooled to room temperature, the thermadapt shape memory polymer with three-dimensional "six-claw stool" shape is fixed and obtaining a new permanent shape of the themadapt shape memory polymer.

The themadapt shape memory polymer with "six-claw stool" shape mentioned above is heated to the temperature above the glass transition temperature (138.1° C.) and transformed into a temporary shape of two-dimensional plane shape under external force; Then cooled to room temperature, the temporary shapes were fixed; finally, when reheated to the temperature above the glass transition temperature (138.1° C.), the thermadapt shape memory polymer with two-dimensional plane shapes will spontaneously recover to the new permanent "six-claw stool" shape.

Figure 8:
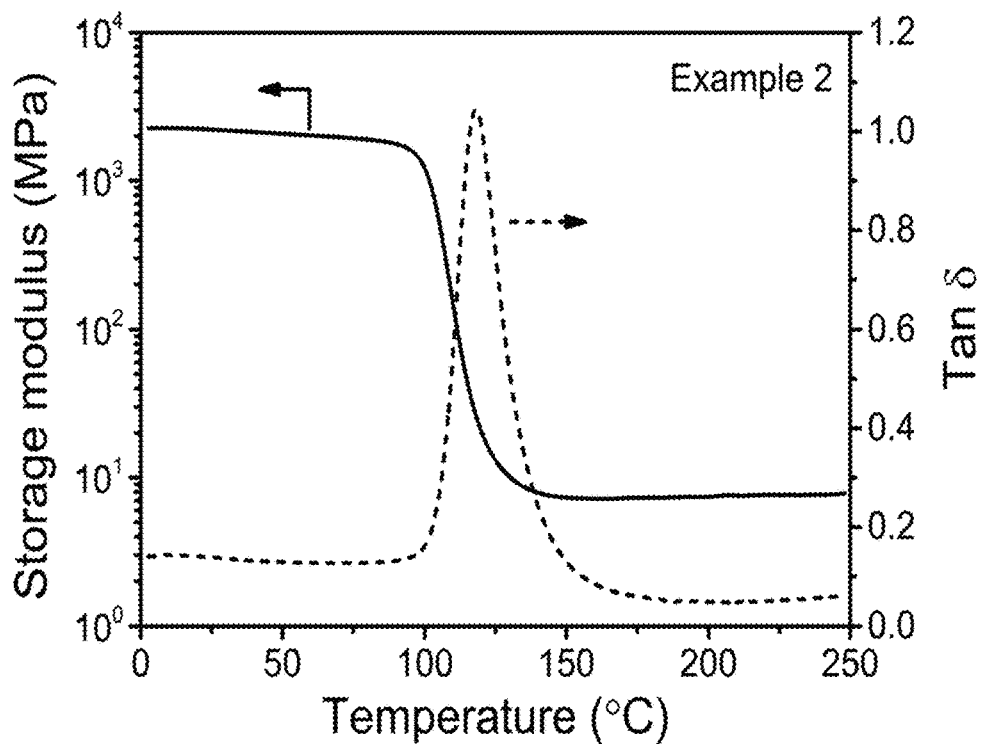
FIG. 8 shows DMA curves of the thermadapt shape memory polymer according to Example 2.

FIG. 8 shows the DMA curves of the thermadapt shape memory polymer according to Example 2. The glass transition temperature of the thermadapt shape memory polymer is 119.8° C.

Figure 9:
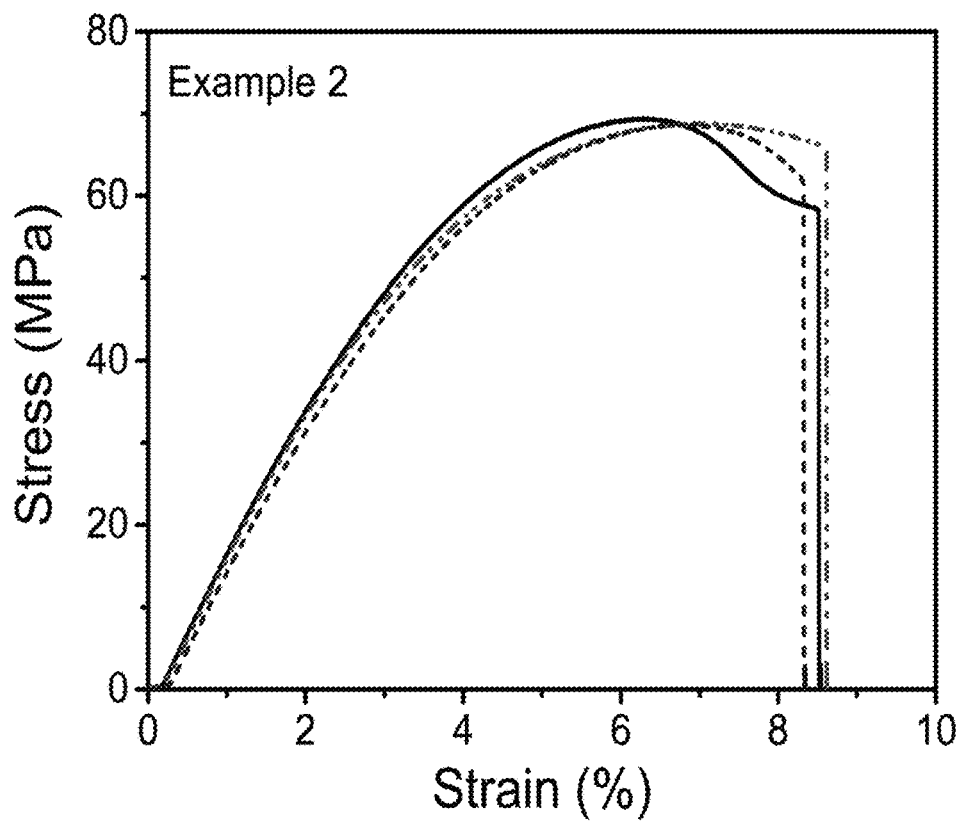
FIG. 9 shows tensile stress-strain curves of the thermadapt shape memory polymer according to Example 2.

FIG. 9 shows the tensile stress-strain curves of the thermadapt shape memory polymer according to Example 2. The tensile strength of the thermadapt shape memory polymer is 68.9±0.4 MPa.

Example 3

(1) under the condition of 25° C., by mass, Bisphenol A epoxy (E51, 50 g), ethanolamine (9 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylmethane (5 g) was added to a three-necked flask and stirred to dissolve in chloroform (100 mL) at room temperature. 3-isocyanatopropyltrimethoxysilane (10.35 g)

was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (2.3 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature (160° C.), the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the thermadapt shape memory polymer.

Figure 14:
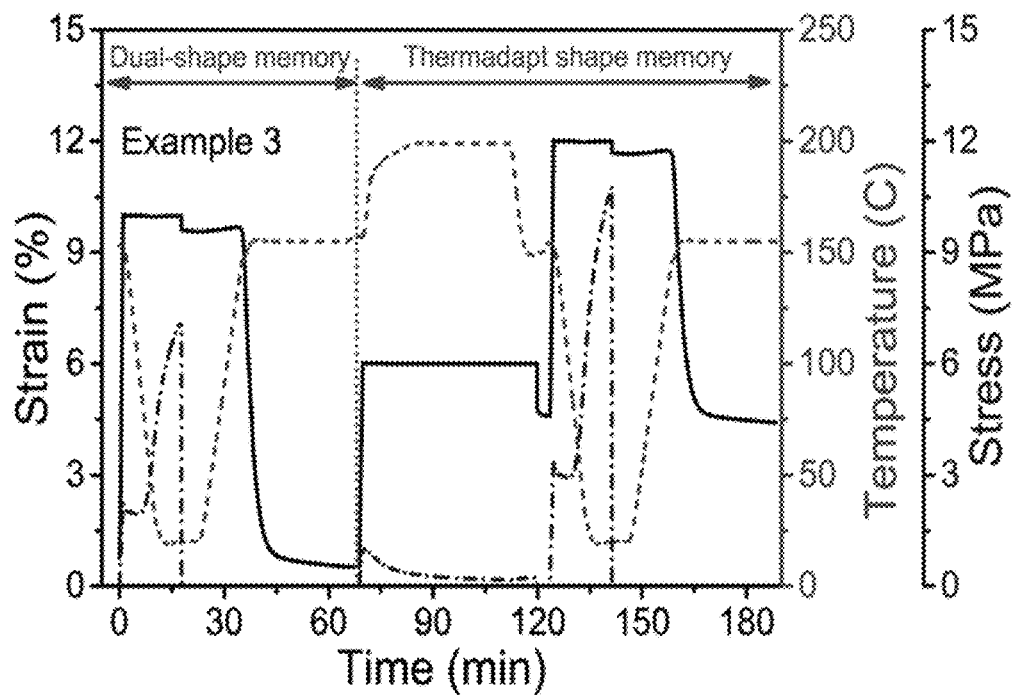
FIG. 14 shows shape memory curves tested by DMA of the thermadapt shape memory polymer according to Example 3.

The thermadapt shape memory polymer with three-dimensional shape mentioned above is heated to the temperature above the glass transition temperature (160° C.) and transformed into a temporary shape of two-dimensional plane or folded shape under external force; Then cooled to room temperature, the temporary shapes were fixed; finally, when reheated to the temperature above the glass transition temperature (160° C.), the thermadapt shape memory polymer with two-dimensional plane or folded temporary shapes will spontaneously recover to the new permanent three-dimensional shape. The shape memory curves tested by DMA of the thermadapt shape memory polymer according to Example 3 are shown in FIG. 14. The shape memory behaviors of the thermadapt shape memory polymer according to Example 3 are shown in FIG. 15.

FIG. 14 shows the shape memory curves tested by DMA of the thermadapt shape memory polymer according to Example 3. The test procedure includes dual-shape memory behavior and thermadapt shape memory behavior. Dual-shape memory behavior is conducted as follows: First, the specimen is heated to the programming temperature (160° C.) and stretched to the strain of 10% under external loading; next, the stretched specimen is cooled to 20° C. and then unloaded the external force to obtain a temporary shape; finally, the specimen with a temporary shape is reheated to 160° C. for recovery without force. thermadapt shape memory behavior is as follows: the specimen is heated to the programming temperature (160° C.) and stretched to the strain of 6% under external loading and then heated to 200° C. and kept for 60 min to trigger the dynamic exchange of silyl ether and hydroxy group in networks and obtaining the reconfiguration shape with strain of 6%; after that, the specimen was continued to conduct a typical dual-shape memory test on the basis of the new permanent strain mentioned above.

Figure 15:
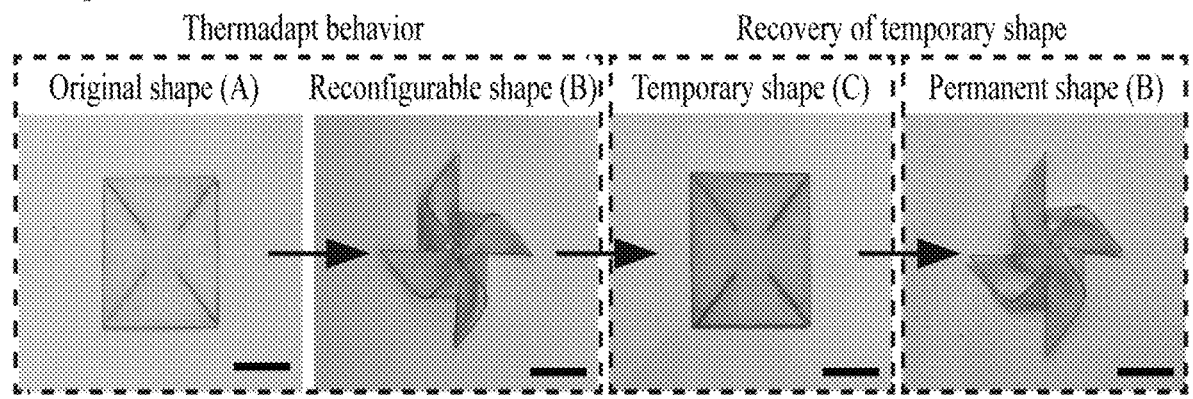
FIG. 15 shows shape memory behaviors of the thermadapt shape memory polymer according to Example 3.

FIG. 15 shows shape memory behaviors of the thermadapt shape memory polymer according to Example 3. When heated to the temperature above the glass transition temperature (160° C.), the thermadapt shape memory polymer was transformed from a two-dimensional plane original shape into a designing three-dimensional "windmill" shape under external force; Then the thermadapt shape memory with box shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional "windmill" shape is fixed and obtaining a new permanent shape of the themadapt shape memory polymer.

The themadapt shape memory polymer with "windmill" shape mentioned above is heated to the temperature above the glass transition temperature (160° C.) and transformed into a temporary shape of two-dimensional plane shape under external force; Then cooled to room temperature, the temporary shapes were fixed; finally, when reheated to the temperature above the glass transition temperature (160° C.), the thermadapt shape memory polymer with two-dimensional plane shapes will spontaneously recover to the new permanent "windmill" shape.

Figure 12:
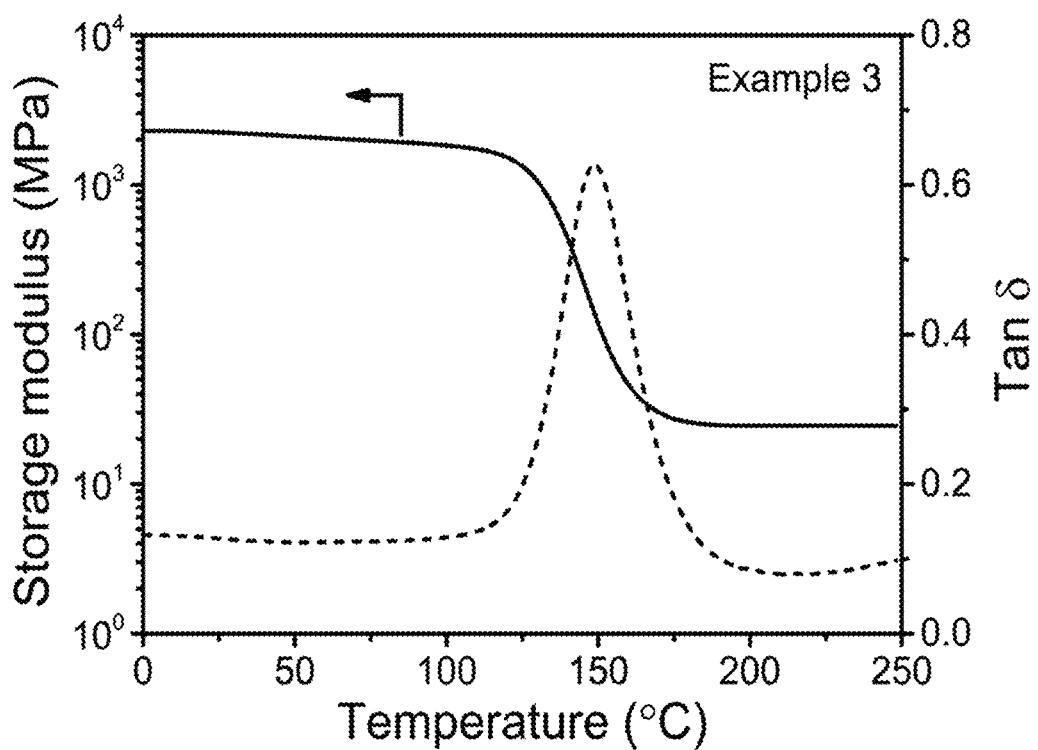
FIG. 12 shows DMA curves of the thermadapt shape memory polymer according to Example 3.

FIG. 12 shows the DMA curves of the thermadapt shape memory polymer according to Example 3. The glass transition temperature of the thermadapt shape memory polymer is 148.8° C.

Figure 13:
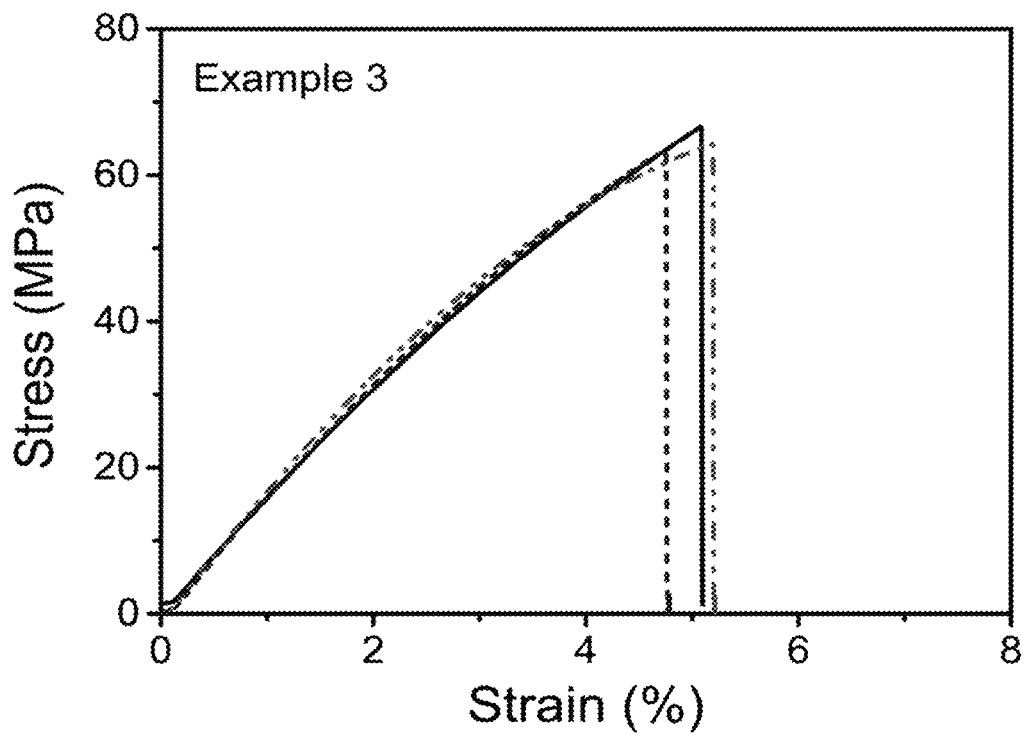
FIG. 13 shows tensile stress-strain curves of the thermadapt shape memory polymer according to Example 3.

FIG. 13 shows the tensile stress-strain curves of the thermadapt shape memory polymer according to Example 3. The tensile strength of the thermadapt shape memory polymer is 64.8±1.6 MPa.

Example 4

(1) under the condition of 25° C., by mass, Bisphenol A epoxy (E51, 50 g), ethanolamine (9 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylmethane (5 g) was added to a three-necked flask and stirred to dissolve in chloroform (100 mL) at room temperature. 3-isocyanatopropyltrimethoxysilane (10.35 g) was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (3 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature (167° C.), the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature (167° C.) and transformed into a temporary shape of two-dimensional plane or folded shape under external force; Then cooled to room temperature, the temporary shapes were fixed; finally, when reheated to the temperature above the glass transition temperature (167° C.), the thermadapt shape memory polymer with two-dimensional plane or folded temporary shapes will spontaneously recover to the new permanent three-dimensional shape. The shape memory curves tested by DMA of the thermadapt shape memory polymer according to Example 4 are shown in FIG. 18.

Figure 18:
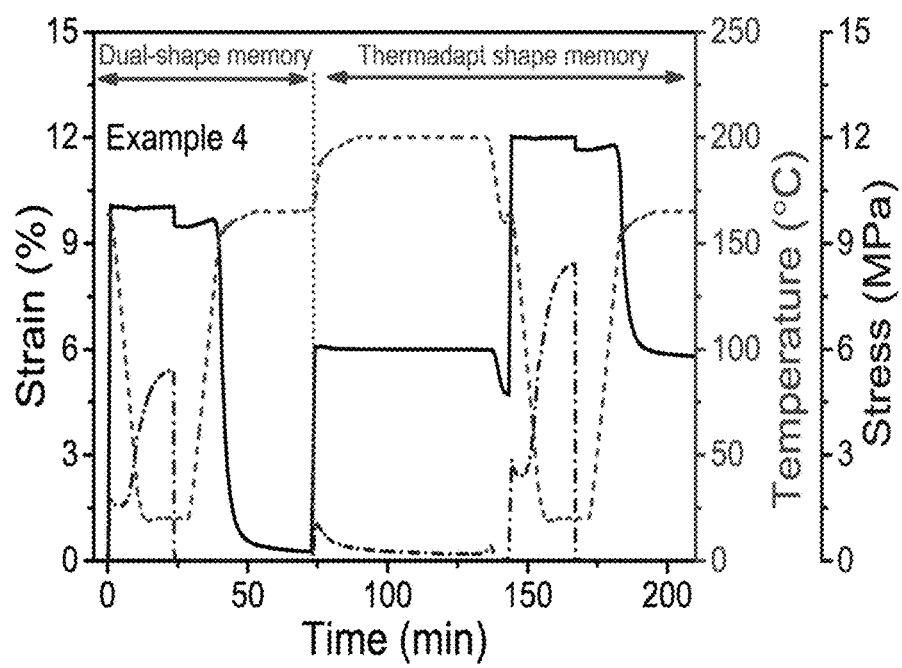
FIG. 18 shows shape memory curves tested by DMA of the thermadapt shape memory polymer according to Example 4.

FIG. 18 shows the shape memory curves tested by DMA of the thermadapt shape memory polymer according to Example 4. The test procedure includes dual-shape memory behavior and thermadapt shape memory behavior. Dual-shape memory behavior is conducted as follows: First, the specimen is heated to the programming temperature (167° C.) and stretched to the strain of 10% under external loading; next, the stretched specimen is cooled to 20° C. and then unloaded the external force to obtain a temporary shape; finally, the specimen with a temporary shape is reheated to 167° C. for recovery without force. thermadapt shape memory behavior is as follows: the specimen is heated to the programming temperature (167° C.) and stretched to the strain of 6% under external loading and then heated to 200° C. and kept for 60 min to trigger the dynamic exchange of silyl ether and hydroxy group in networks and obtaining the reconfiguration shape with strain of 6%; after that, the specimen was continued to conduct a typical dual-shape memory test on the basis of the new permanent strain mentioned above.

Figure 19:
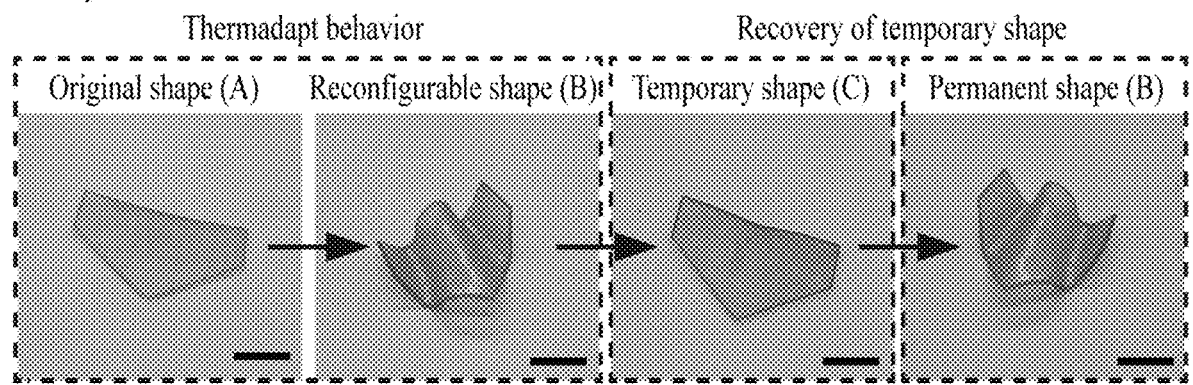
FIG. 19 shows shape memory behaviors of the thermadapt shape memory polymer according to Example 4.

FIG. 19 shows shape memory behaviors of the thermadapt shape memory polymer according to Example 4. When heated to the temperature above the glass transition temperature (166.4° C.), the thermadapt shape memory polymer was transformed from a two-dimensional plane original shape into a designing three-dimensional "paper airplane" shape under external force; Then the thermadapt shape memory with box shape was heated to 220° C. and keep the temperature and the external force, and the dynamic exchange reaction of silyl ether and hydroxy group in networks and realizing the reconfiguration of networks; When cooled to room temperature, the thermadapt shape memory polymer with three-dimensional "paper airplane" shape is fixed and obtaining a new permanent shape of the themadapt shape memory polymer.

The themadapt shape memory polymer with "paper airplane" shape mentioned above is heated to the temperature above the glass transition temperature (166.4° C.) and transformed into a temporary shape of two-dimensional plane shape under external force; Then cooled to room temperature, the temporary shapes were fixed; finally, when reheated to the temperature above the glass transition temperature (166.4° C.), the thermadapt shape memory polymer with two-dimensional plane shapes will spontaneously recover to the new permanent "paper airplane" shape.

Figure 16:
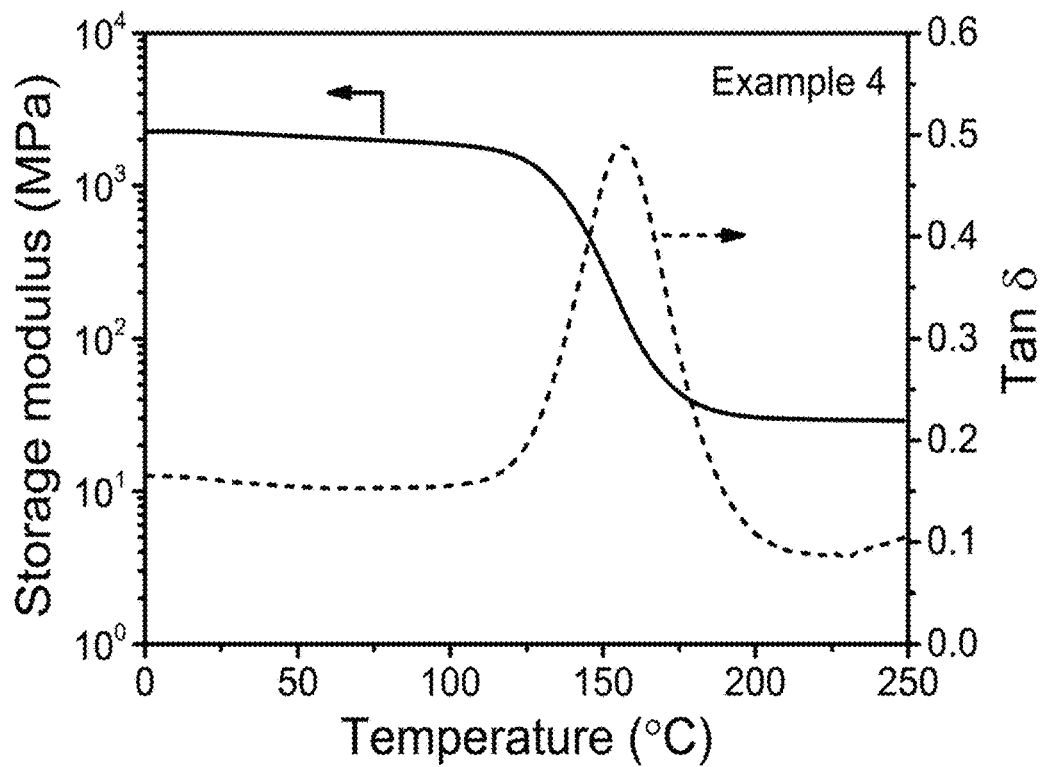
FIG. 16 shows DMA curves of the thermadapt shape memory polymer according to Example 4.

FIG. 16 shows the DMA curves of the thermadapt shape memory polymer according to Example 4. The glass transition temperature of the thermadapt shape memory polymer is 156.4° C.

Figure 17:
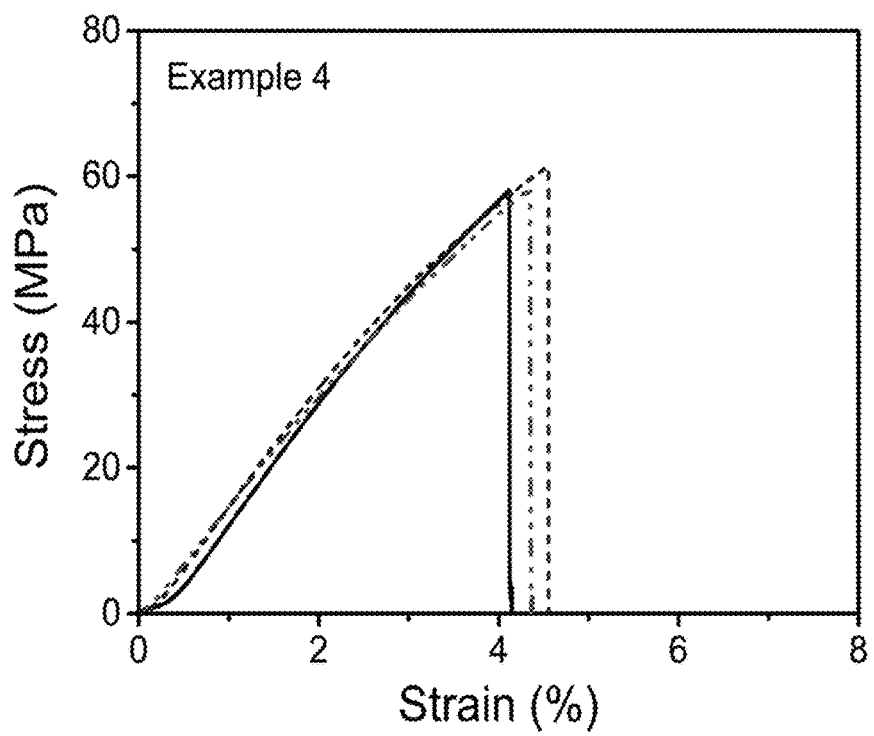
FIG. 17 shows tensile stress-strain curves of the thermadapt shape memory polymer according to Example 4.

FIG. 17 shows the tensile stress-strain curves of the thermadapt shape memory polymer according to Example 3. The tensile strength of the thermadapt shape memory polymer is 59.3±1.8 MPa.

Table 1 shows the performance indexes such as glass transition temperature, initial thermal decomposition temperature and tensile strength of thermadapt shape memory polymers prepared by Example 1, 2, 3 and 4 and existing thermadapt shape memory polymers reported. As shown in Table 1, the thermadapt shape memory polymer provided by Example 1-4 in the present invention exhibit both high glass transition temperature and high tensile strength.

TABLE 1

Performance indexes such as glass transition temperature, initial thermal decomposition temperature and tensile strength of thermadapt shape memory polymers reported until now

| Thermadapt shape memory polymers | Glass transition temperature (° C.) | Initial thermal decomposition temperature (° C.) | Tensile strength (MPa) | Reference |
|---|---|---|---|---|
| Example 1 | 129.3 | 314 | 82.4 ± 1.3 | |
| Example 2 | 119.8 | 325 | 68.9 ± 0.4 | |
| Example 3 | 148.8 | 303 | 64.8 ± 1.6 | |
| Example 4 | 156.4 | 296 | 59.3 ± 1.8 | |
| Epoxy resin 1 | 42.9 | 345 | 12.0 ± 0.8 | [1] |
| Epoxy resin 2 | 53 | 310 | ~25 | [2] |
| Epoxy resin 3 | 41.4 | 268.8 | 10.9 ± 2.2 | [3] |
| Epoxy resin 4 | 75 | — | — | [4] |
| Polysulfide networks | 36.4 | 252.9 | ~5 | [5] |
| Thermoset polyurethane 1 | 57 | — | ~17 | [6] |
| Thermoset polyurethane 2 | ~50 | — | 8.16 ± 0.57 | [7] |
| Thermoset polyurethane 3 | ~40 | — | ~1.1 | [8] |
| Thermoset polyurethane 4 | ~41 | — | — | [9] |

TABLE 1-continued

Performance indexes such as glass transition temperature, initial thermal decomposition temperature and tensile strength of thermadapt shape memory polymers reported until now

| Thermadapt shape memory polymers | Glass transition temperature (° C.) | Initial thermal decomposition temperature (° C.) | Tensile strength (MPa) | Reference |
|---|---|---|---|---|
| Thermoset polyurethane 5 | ~80 | — | — | [10] |
| Crosslinked polyanhydride | ~30 | — | 4~5 | [11] |
| Crosslinked poly(caprolactone) | ~55 | — | — | [12] |

Reference:
[1] Z. Yang, Q. Wang and T. Wang, *ACS Applied Materials & Interfaces*, 2016, 8, 21691-21699.
[2] T. Liu, C. Hao, L. Wang, Y. Li, W. Liu, J. Xin and J. Zhang, *Macromolecules*, 2017, 50, 8588-8597.
[3] Z. Ma, Y. Wang, J. Zhu, J. Yu and Z. Hu, *Journal of Polymer Science Part A: Polymer Chemistry*, 2017, 55, 1790-1799.
[4] J. Zhu, G. Fang, Z. Cao, X. Meng and H. Ren, *Industrial & Engineering Chemistry Research*, 2018, 57, 5276-5281.
[5] S. Zhang, L. Pan, L. Xia, Y. Sun and X. Liu, *Reactive and Functional Polymers*, 2017, 121, 8-14.
[6] S. Ji, F. Fan, C. Sun, Y. Yu and H. Xu, *ACS Applied Materials & Interfaces*, 2017, 9, 33169-33175.
[7] Y. Wang, Y. Pan, Z. Zheng and X. Ding, *Macromolecular Rapid Communications*, 2018, 39, 1800128.
[8] Z. Fang, N. Zheng, Q. Zhao and T. Xie, *ACS Applied Materials & Interfaces*, 2017, 9, 22077-22082.
[9] N. Zheng, Z. Fang, W. Zou, Q. Zhao and T. Xie, *Angewandte Chemie International Edition*, 2016, 55, 11421-11425.
[10] N. Zheng, J. Hou, Y. Xu, Z. Fang, W. Zou, Q. Zhao and T. Xie, *ACS Macro Letters*, 2017, 6, 326-330.
[11] M. I. Lawton, K. R. Tillman, H. S. Mohammed, W. Kuang, D. A. Shipp and P. T. Mather, *ACS Macro Letters*, 2016, 5, 203-207.
[12] Q. Zhao, W. Zou, Y. Luo and T. Xie, *Science Advances*, 2016, 2, e1501297.

Example 5

(1) under the condition of 25° C., by mass, Bisphenol F epoxy resin (NPEF-170, 50 g), 3-aminopropanol (11 g) and N,N-Dimethylformamide (300 mL) were added into a round-bottomed flask, and then the mixture was heated to 120° C. and kept for 10 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in dichloromethane (100 mL) at room temperature. 3-isocyanatopropyltriethoxysilane (9.95 g) was added in drops to the above solution with stirring under nitrogen atmosphere. After that, the solution was heated to 80° C. and maintained for 5 h. When the reaction finished, the solvent was removed by rotary evaporator. After dried in the vacuum oven, silane crosslinking agent with terminated ethoxy groups was obtained.

(3) under the condition of 25° C., by mass, epoxy oligomer with hydroxyl side-groups according to step 1 (5 g) and silane crosslinking agent with terminated ethoxy groups according to step 1 (1.5 g) were dissolved in N,N-Dimethylformamide at room temperature to obtain a uniform mixture. The mixture was poured into a mold and then putting the mold in the vacuum oven at 80° C. for 11 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 15° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 15° C. and transformed into a temporary shape of two-dimensional plane or folded shape under external force; Then cooled to room temperature, the temporary shapes were fixed; finally, when reheated to the temperature above the glass transition temperature 15° C., the thermadapt shape memory polymer with two-dimensional plane or folded temporary shapes will spontaneously recover to the new permanent three-dimensional shape.

Example 6

(1) under the condition of 25° C., by mass, Bisphenol F epoxy resin (NPEF-170, 50 g), 3-aminopropanol (11 g) and N,N-Dimethylformamide (300 mL) were added into a round-bottomed flask, and then the mixture was heated to 120° C. and kept for 10 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in dichloromethane (100 mL) at room temperature. 3-isocyanatopropyltriethoxysilane (9.95 g) was added in drops to the above solution with stirring under nitrogen atmosphere. After that, the solution was heated to 80° C. and maintained for 5 h. When the reaction finished, the solvent was removed by rotary evaporator. After dried in the vacuum oven, silane crosslinking agent with terminated ethoxy groups was obtained.

(3) under the condition of 25° C., by mass, epoxy oligomer with hydroxyl side-groups according to step 1 (5 g) and silane crosslinking agent with terminated ethoxy groups according to step 1 (2 g) were dissolved in N,N-Dimethylformamide at room temperature to obtain a uniform mixture. The mixture was poured into a mold and then putting the mold in the vacuum oven at 80° C. for 11 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 15° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the thermadapt shape memory polymer.

The themadapt shape memory polymer with three-dimensional shape mentioned above is heated to the temperature above the glass transition temperature 15° C. and transformed into a temporary shape of two-dimensional plane or folded shape under external force; Then cooled to room temperature, the temporary shapes were fixed; finally, when reheated to the temperature above the glass transition temperature 15° C., the thermadapt shape memory polymer with two-dimensional plane or folded temporary shapes will spontaneously recover to the new permanent three-dimensional shape.

Example 7

(1) under the condition of 25° C., by mass, Bisphenol F epoxy resin (NPEF-170, 50 g), 3-aminopropanol (11 g) and N,N-Dimethylformamide (300 mL) were added into a round-bottomed flask, and then the mixture was heated to 120° C. and kept for 10 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in dichloromethane (100 mL) at room temperature. 3-isocyanatopropyltriethoxysilane (9.95 g) was added in drops to the above solution with stirring under nitrogen atmosphere. After that, the solution was heated to 80° C. and maintained for 5 h. When the reaction finished, the solvent was removed by rotary evaporator. After dried in the vacuum oven, silane crosslinking agent with terminated ethoxy groups was obtained.

(3) under the condition of 25° C., by mass, epoxy oligomer with hydroxyl side-groups according to step 1 (5 g) and silane crosslinking agent with terminated ethoxy groups according to step 1 (2.5 g) were dissolved in N,N-Dimethylformamide at room temperature to obtain a uniform mixture. The mixture was poured into a mold and then putting the mold in the vacuum oven at 80° C. for 11 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 18° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 18° C. and transformed into a temporary shape of two-dimensional plane or folded shape under external force; Then cooled to room temperature, the temporary shapes were fixed; finally, when reheated to the temperature above the glass transition temperature 18° C., the thermadapt shape memory polymer with two-dimensional plane or folded temporary shapes will spontaneously recover to the new permanent three-dimensional shape.

Example 8

(1) under the condition of 25° C., by mass, hydrogenated epoxy resin (YDH3000, 50 g), 3-aminopropanol (10.5 g) and N,N-Dimethylformamide (300 mL) were added into a round-bottomed flask, and then the mixture was heated to 120° C. and kept for 11 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in 1,2-dichloroethane (100 mL) at room temperature. 3-isocyanatopropyltrimethoxysilane (10.25 g) was added in drops to the above solution with stirring under nitrogen atmosphere. After that, the solution was heated to 80° C. and maintained for 6 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (1.25 g) were dissolved in N,N-Dimethylformamide at room temperature to obtain a uniform mixture. The mixture was poured into a mold and then putting the mold in the vacuum oven at 80° C. for 10 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 20° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 20° C. and transformed into a temporary shape of two-dimensional plane or folded shape under external force; Then cooled to room temperature, the temporary shapes were fixed; finally, when reheated to the temperature above the glass transition temperature 20° C., the thermadapt shape memory polymer with two-dimensional plane or folded temporary shapes will spontaneously recover to the new permanent three-dimensional shape.

Example 9

(1) under the condition of 25° C., by mass, hydrogenated epoxy resin (YDH3000, 50 g), 3-aminopropanol (10.5 g) and N,N-Dimethylformamide (300 mL) were added into a round-bottomed flask, and then the mixture was heated to 120° C. and kept for 11 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in 1,2-dichloroethane (100 mL) at room temperature. 3-isocyanatopropyltrimethoxysilane (10.25 g) was added in drops to the above solution with stirring under nitrogen atmosphere. After that, the solution was heated to 80° C. and maintained for 6 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (1.75 g) were dissolved in N,N-Dimethylformamide at room temperature to obtain a uniform mixture. The mixture was poured into a mold and then putting the mold in the vacuum oven at 80° C. for 10 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 10° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 10° C. and transformed into a temporary shape of two-dimensional plane or folded shape under external force; Then cooled to room temperature, the temporary shapes were fixed; finally, when reheated to the temperature above the glass transition temperature 10° C., the thermadapt shape memory polymer with two-dimensional plane or folded temporary shapes will spontaneously recover to the new permanent three-dimensional shape.

Example 10

(1) under the condition of 25° C., by mass, Bisphenol A epoxy (E51, 50 g), ethanolamine (9 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylmethane (5 g) was added to a three-necked flask and stirred to dissolve in chloroform (100 mL) at room temperature. 3-isocyanatopropyltrimethoxysilane (10.35 g) was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (0.34 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 10° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 10° C. and transformed into a temporary shape of two-dimensional plane or folded shape under external force; Then cooled to room temperature, the temporary shapes were fixed; finally, when reheated to the temperature above the glass transition temperature 10° C., the thermadapt shape memory polymer with two-dimensional plane or folded temporary shapes will spontaneously recover to the new permanent three-dimensional shape.

Figure 20:
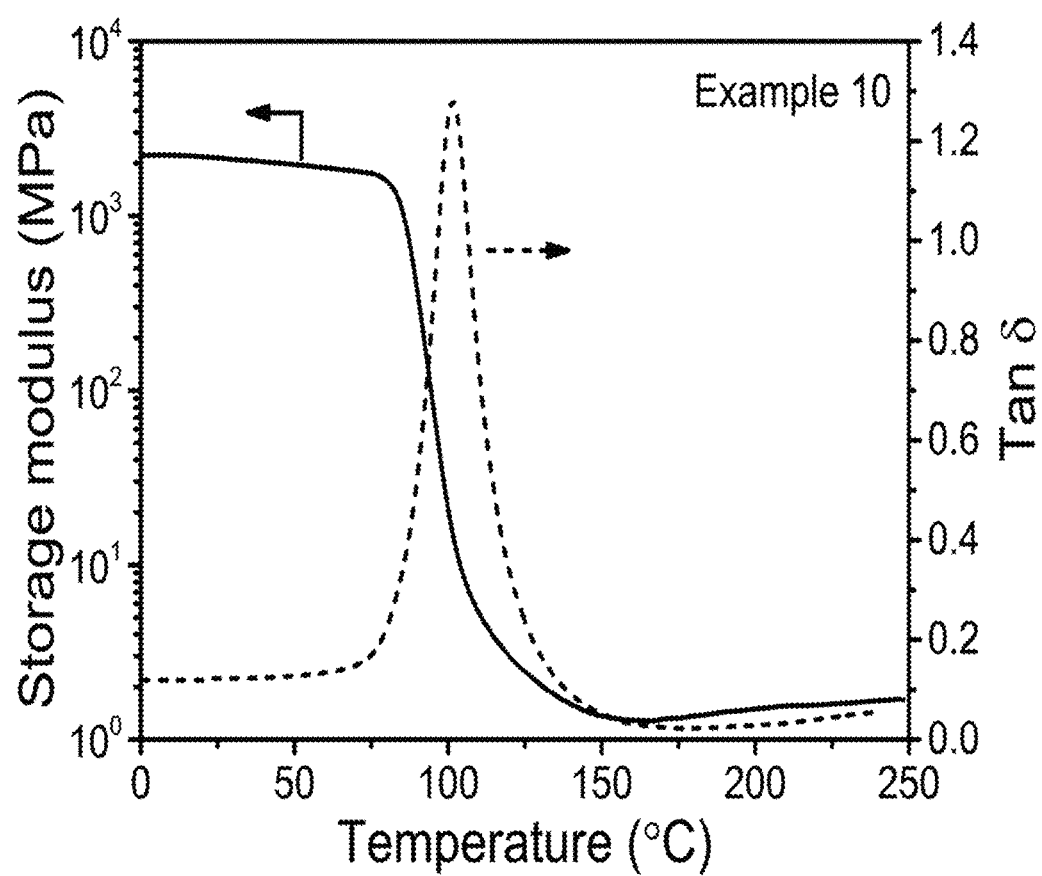
FIG. 20 shows DMA curves of the thermadapt shape memory polymer according to Example 10.

FIG. 20 shows the DMA curves of the thermadapt shape memory polymer according to Example 10. The glass transition temperature of the thermadapt shape memory polymer is 99.6° C. The tensile strength of the thermadapt shape memory polymer is 30.1±2.7 MPa.

Example 11

(1) under the condition of 25° C., by mass, Bisphenol A epoxy resin (E51, 27 g), Bisphenol F epoxy resin (NPEF-170, 23 g) and ethanolamine (10 g) and N,N-Dimethylformamide (300 mL) were added into a round-bottomed flask, and then the mixture was heated to 120° C. and kept for 12 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylmethane (2.52 g) and 4,4'-diaminodiphenylsulfone (2.49 g) was added to a three-necked flask and stirred to dissolve in dichloromethane/chloroform mixtures (100 mL) at room temperature. 3-isocyanatopropyltrimethoxysilane (10.3 g) was added in drops to the above solution with stirring under nitrogen atmosphere. After that, the solution was heated to 80° C. and maintained for 4 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (2 g) were dissolved in N,N-Dimethylformamide at room temperature to obtain a uniform mixture. The mixture was poured into a mold and then putting the mold in the vacuum oven at 80° C. for 12 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 10° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the thermadapt shape memory polymer.

The themadapt shape memory polymer with three-dimensional shape mentioned above is heated to the temperature above the glass transition temperature 10° C. and transformed into a temporary shape of two-dimensional plane or folded shape under external force; Then cooled to room temperature, the temporary shapes were fixed; finally, when reheated to the temperature above the glass transition temperature 10° C., the thermadapt shape memory polymer with two-dimensional plane or folded temporary shapes will spontaneously recover to the new permanent three-dimensional shape.

Example 12

(1) under the condition of 25° C., by mass, hydrogenated epoxy resin (YDH3000, 50 g), 3-aminopropanol (10.5 g) and N,N-Dimethylformamide (300 mL) were added into a round-bottomed flask, and then the mixture was heated to 120° C. and kept for 11 h under nitrogen atmosphere. When the reaction finished, the resulting solution was added drop by drop into the deionized water to separate out the white solid. After filtration, washing and drying, the epoxy oligomer with hydroxyl side-groups was obtained.

(2) under the condition of 25° C., by mass, 4,4'-diaminodiphenylsulfone (5 g) was added to a three-necked flask and stirred to dissolve in 1,2-dichloroethane (100 mL) at room temperature. 3-isocyanatopropyltrimethoxysilane (10.25 g) was added in drops to the above solution with stirring under nitrogen atmosphere. After that, the solution was heated to 80° C. and maintained for 6 h. When the reaction finished, the solvent was removed by rotary evaporator. After dried in the vacuum oven, silane crosslinking agent with terminated methoxy groups was obtained.

(3) under the condition of 25° C., by mass, epoxy oligomer with hydroxyl side-groups according to step 1 (5 g) and silane crosslinking agent with terminated methoxy groups according to step 1 (2.25 g) were dissolved in N,N-Dimethylformamide at room temperature to obtain a uniform mixture. The mixture was poured into a mold and then putting the mold in the vacuum oven at 80° C. for 10 h. After that, the obtained polymer film was put out of the mold and dried in vacuum oven according to the process of 120° C./12 h+200° C./2 h, and the thermadapt shape memory polymer was obtained.

(4) When heated to the temperature above the glass transition temperature 15° C., the thermadapt shape memory polymer was transformed from a two-dimensional plane original shape into a designing three-dimensional shape under external force; Then the thermadapt shape memory with three-dimensional shape was heated to 200° C. and keep the temperature and the external force, and the dynamic exchange reaction of silyl ether and hydroxy group in networks and realizing the reconfiguration of networks; When cooled to room temperature, the thermadapt shape memory polymer with three-dimensional shape is fixed and obtaining a new permanent shape of the themadapt shape memory polymer.

The themadapt shape memory polymer with three-dimensional shape mentioned above is heated to the temperature above the glass transition temperature 15° C. and transformed into a temporary shape of two-dimensional plane or folded shape under external force; Then cooled to room temperature, the temporary shapes were fixed; finally, when reheated to the temperature above the glass transition temperature 15° C., the thermadapt shape memory polymer with two-dimensional plane or folded temporary shapes will spontaneously recover to the new permanent three-dimensional shape.

The invention claimed is:

1. A thermadapt shape memory polymer prepared by a preparation method comprising the following steps:
   (1) synthesizing an epoxy oligomer with hydroxyl side-groups by reacting an epoxy resin and an alcohol amine;
   (2) synthesizing a silane crosslinking agent with terminated alkoxyl groups by reacting a silane coupling agent and a diamine;
   (3) synthesizing the thermadapt shape memory polymer by reacting the epoxy oligomer with hydroxyl side-groups with the silane crosslinking agent with terminated alkoxyl groups.

2. The thermadapt shape memory polymer of claim 1, wherein: the epoxy resin includes one or more of bisphenol A epoxy resin, bisphenol F epoxy resin, or hydrogenated epoxy resin; the alcohol amine comprises one or more of an ethanolamine, a 3-aminopropanol and a 2-(2-aminoethoxy) ethanol; the diamine is one or more of 4,4'-methylenedianiline, 4,4'-diaminodiphenylsulfone and 4,4'-oxydianiline; and the silane coupling agent is an isocyanate silane coupling agent.

3. The thermadapt shape memory polymer of claim 2, wherein: the isocyanate silane coupling agent is one or more of 3-isocyanatopropyltrimethoxysilane and 3-isocyanatopropyltriethoxysilane.

4. The thermadapt shape memory polymer of claim 1, wherein: the epoxy resin reacts with the alcohol amine in amide solvent under nitrogen atmosphere and; the silane coupling agent reacts with the diamine in the presence of chlorohydrin under nitrogen atmosphere.

5. The thermadapt shape memory polymer of claim 1, wherein: the reaction temperature of the epoxy resin and the alcohol amine is 120° C. and the reaction time is 10-12 h; the reaction temperature of the silane coupling agent and the diamine is 80° C. and the reaction time is 4-6 h; and the reaction temperature of the epoxy oligomer with hydroxyl side-groups and the silane crosslinking agent with terminated alkoxyl groups is 80° C. and the reaction time is 10-12 h.

6. The thermadapt shape memory polymer of claim 1, wherein: the mass ratio of the epoxy resin to the alcohol amine is 100:(15-25); the mass ratio of the silane coupling agent and the diamine is 100: (190~230); and the mass ratio of the epoxy oligomer with hydroxyl side-groups to the silane crosslinking agent with terminated alkoxyl groups is 100:(20-60).

7. The thermadapt shape memory polymer of claim 1, wherein: in the step (3), the thermadapt shape memory polymer are synthesized as follows: dissolving the epoxy oligomer with hydroxyl side-groups and the silane crosslinking agent with terminated alkoxyl groups in amide solvent and crosslinking the epoxy oligomer with hydroxyl side-groups and the silane crosslinking agent with terminated alkoxyl groups to form a network, and subsequently drying to obtain the thermadapt shape memory polymer.

8. The thermadapt shape memory polymer of claim 1, prepared by a preparation method further comprising the following steps:
(4) heating the thermadapt shape memory polymer to a temperature above its glass transition temperature and deforming to a fixed memory shape; heating the fixed memory shape to 180-200° C. for 1-2 h; after that, cooling the shape memory polymer to room temperature to obtain a thermadapt shape memory polymer with a reconfigurable permanent shape;
(5) heating the thermadapt shape memory polymer with a reconfigurable permanent shape obtained in step (1) to a temperature above its glass transition temperature and then forming the polymer material into a temporary shape, then cooling to room temperature and obtaining a shape memory polymer material with a temporary shape; and
(6) reheating the shape memory polymer material with a temporary shape above its glass transition temperature to obtain a polymer material with a reconfigurable permanent shape and complete the shape recovery of the thermadapt shape memory polymer.

9. The thermadapt shape memory polymers of claim 8, wherein: the temperature above the glass transition temperature in steps (4) or (5) is over the glass transition temperature by 10-20° C.

10. The thermadapt shape memory polymers of claim 8, wherein the thermadapt shape memory polymers are made into the reconfigurable memory shape or the temporary shape by applying external force.

* * * * *